(12) United States Patent
Dal Mutto et al.

(10) Patent No.: US 11,481,915 B2
(45) Date of Patent: Oct. 25, 2022

(54) SYSTEMS AND METHODS FOR THREE-DIMENSIONAL DATA ACQUISITION AND PROCESSING UNDER TIMING CONSTRAINTS

(71) Applicant: PACKSIZE LLC, Salt Lake City, UT (US)

(72) Inventors: Carlo Dal Mutto, Sunnyvale, CA (US); Francesco Peruch, Sunnyvale, CA (US)

(73) Assignee: PACKSIZE LLC, Salt Lake City, UT (US)

( * ) Notice: Subject to any disclaimer, the term of this patent is extended or adjusted under 35 U.S.C. 154(b) by 0 days.

(21) Appl. No.: 16/404,590

(22) Filed: May 6, 2019

(65) Prior Publication Data

US 2020/0098122 A1    Mar. 26, 2020

Related U.S. Application Data

(60) Provisional application No. 62/666,942, filed on May 4, 2018.

(51) Int. Cl.
*G06T 7/593*       (2017.01)
*G06T 7/00*        (2017.01)
*G06T 19/00*       (2011.01)

(52) U.S. Cl.
CPC .............. *G06T 7/593* (2017.01); *G06T 7/001* (2013.01); *G06T 19/003* (2013.01)

(58) Field of Classification Search
CPC .......... G06T 7/593; G06T 7/001; G06T 7/00; G06T 19/003; G01N 2021/845; G01N 2021/8883; G01N 2021/8887; G01N 21/8851; H04N 2013/0081; H04N 5/232; H04N 5/232061; H04N 5/247
See application file for complete search history.

(56) References Cited

U.S. PATENT DOCUMENTS

| | | | |
|---|---|---|---|
| RE44,353 E * | 7/2013 | Mirtich ................. | G06F 9/451 382/100 |
| 2010/0013934 A1 | 1/2010 | Saporetti | |
| 2013/0242105 A1* | 9/2013 | Boyle ............. | H04N 21/21805 348/157 |
| 2014/0307056 A1* | 10/2014 | Collet Romea ......... | G06T 7/136 348/47 |
| 2016/0173752 A1 | 6/2016 | Caviedes et al. | |

(Continued)

OTHER PUBLICATIONS

International Search Report and Written Opinion for International Application No. PCT/US19/30951, dated Oct. 4, 2019, 8 pages.

*Primary Examiner* — Marcos L Torres
(74) *Attorney, Agent, or Firm* — Workman Nydegger

(57) ABSTRACT

A system for acquiring three-dimensional (3-D) models of objects includes a first camera group including: a first plurality of depth cameras having overlapping fields of view; a first processor; and a first memory storing instructions that, when executed by the first processor, cause the first processor to: control the first depth cameras to simultaneously capture a first group of images of a first portion of a first object; compute a partial 3-D model representing the first portion of the first object; and detect defects in the first object based on the partial 3-D model representing the first portion of the first object.

26 Claims, 9 Drawing Sheets

(56) References Cited

U.S. PATENT DOCUMENTS

2016/0375524 A1* 12/2016 Hsu ..................... B23K 37/00
                                                    228/8
2017/0305694 A1* 10/2017 McMurrough ...... B25J 15/0616
2018/0047208 A1    2/2018 Marin et al.

* cited by examiner

SYSTEMS AND METHODS FOR THREE-DIMENSIONAL DATA ACQUISITION AND PROCESSING UNDER TIMING CONSTRAINTS

CROSS-REFERENCE TO RELATED APPLICATION(S)

This application claims the benefit of U.S. Provisional Patent Application No. 62/666,942, titled "SYSTEMS AND METHODS FOR THREE-DIMENSIONAL DATA ACQUISITION AND PROCESSING UNDER TIMING CONSTRAINTS," filed in the United States Patent and Trademark Office on May 4, 2018, the entire disclosure of which is incorporated by reference herein.

FIELD

Aspects of embodiments of the present invention relate to the three-dimensional (3-D) scanning of objects, including the acquisition of 3-D data of objects, including the 3-D shapes and surface textures of objects.

BACKGROUND

Three-dimensional (3-D) scanning systems can be used to capture 3-D data about objects. A conventional camera captures a single two-dimensional (2-D) image of an object at a time. In contrast, a three-dimensional camera system can capture 3-D data about the object, including information about the 3-D shape of the object. The 3-D data may be represented as, for example, a "point cloud" (e.g., a collection of three-dimensional coordinates representing positions on the surface of the object) and a 3-D mesh model (e.g., a collection of polygons, such as triangles, arranged in in three-dimensional space, where the polygons represent the surface of the object). Examples of 3-D camera systems (also referred to as depth camera systems) and/or 3-D scanning systems include stereoscopic camera systems and time-of-flight (ToF) cameras. See, e.g., Hartley, Richard, and Andrew Zisserman. Multiple View Geometry In Computer Vision. Cambridge University Press, 2003, R. Szeliski. "Computer Vision: Algorithms and Applications", Springer, 2010 pp. 467 et seq. and P. Zanuttigh et al. "Time-of-Flight and Structured Light Depth Cameras", Springer, 2015.

The 3-D data captured by a three-dimensional scanning system conveys more information about the object than a 2-D image of the object. The 3-D data may sometimes be referred to as a depth map or as a 3-D model (including point clouds and 3-D mesh models). For example, while a 2-D image generally provides only a single static view of an object, typically, a user can manipulate a view of a the 3-D data (e.g., by rotating, repositioning, and scaling a view of the 3-D or by changing the position of a virtual camera), thereby allowing the user viewing the model to develop a better understanding of the shape of the object represented by the 3-D data. Similarly, some techniques for the automatic analysis of scanned objects, such as computing the size and shape of objects, are more readily performed on 3-D models of the objects, rather than separate 2-D images of the objects.

SUMMARY

Aspects of embodiments of the present invention relate to systems and methods for acquiring three-dimensional (3-D) data about objects, such as a 3-D scan of the physical shape and surface texture (e.g., colors) of an object, which may be used to generate a 3-D model of the object.

Aspects of embodiments of the present invention also relate to systems and methods for coordinating multiple camera systems to capture multiple views of an object and to combine the data captured by the different camera systems to construct a 3-D model of the object.

According to one embodiment of the present invention, a system for acquiring three-dimensional (3-D) models of objects includes a first camera group including: a first plurality of depth cameras having overlapping fields of view; a first processor; and a first memory storing instructions that, when executed by the first processor, cause the first processor to: control the first depth cameras to simultaneously capture a first group of images of a first portion of a first object; compute a partial 3-D model representing the first portion of the first object; and detect defects in the first object based on the partial 3-D model representing the first portion of the first object.

The first camera group may further include a first start trigger configured to detect the arrival of an object when the object enters the overlapping fields of view of the first depth cameras, and wherein the first processor may be configured to control the first depth cameras of the first camera group to capture images of the object in response to receiving a triggering signal from the first start trigger.

The first camera group may further include a first stop trigger configured to detect the departure of the object from the overlapping fields of view of the first depth cameras, and the first processor may be configured to control the first depth cameras of the first camera group to cease capture of images of the object in response to receiving a triggering signal from the first stop trigger.

The first camera group may further include a first prepare trigger configured to detect the presence of the object before the object enters the overlapping fields of view of the first depth cameras, and wherein the first processor may be configured to control the first depth cameras of the first camera group to prepare to capture of images of the object in response to receiving a triggering signal from the first prepare trigger.

The overlapping fields of view of the first depth cameras may be directed to a portion of a conveyor system configured to convey a plurality of objects, and the conveyor system may be configured to convey the objects to enter the overlapping fields of view of the first depth cameras one at a time.

The conveyor system may move at a non-uniform speed and the objects may arrive within the overlapping fields of view of the first camera group at a plurality of different rates, the different rates including a maximum burst rate and an associated maximum burst time, and the first memory of the first camera group may include a buffer having a size sufficient to store images of the objects arriving a maximum burst rate during the associated maximum burst time, the size being a function of at least a resolution of the first depth cameras and a frame rate of the first depth cameras.

The conveyor system may move at a non-uniform speed and the objects may arrive within the overlapping fields of view of the first camera group at a plurality of different rates, the first memory of the first camera group may include a buffer configured to store images captured by the first depth cameras, and the first memory may further store instructions that, when executed by the first processor, cause the first processor to: determine a current buffer occupancy of the buffer; determine whether the current buffer occupancy exceeds a threshold; in response to determining that the current buffer occupancy does not exceed the threshold, set configuration parameters of the first camera group to a nominal capture quality; and in response to determining that the current buffer occupancy exceeds the threshold: determine a new quality level based on a plurality of configuration settings stored in the first memory, the current buffer occupancy, and a current rate of the plurality of different rates; and set the configuration parameters of the first camera group to the new quality level.

The system may further include a second camera group including: a second plurality of depth cameras having overlapping fields of view, the second depth cameras being spaced apart from the first depth cameras; a second processor; and a second memory storing instructions that, when executed by the second processor, cause the second processor to: control the second depth cameras to simultaneously capture a second group of images of a second portion of the first object; compute a partial 3-D model representing the second portion of the first object; and detect defects in the first object based on the partial 3-D model representing the second portion of the first object.

The system may further include a coordinating server including a third processor and a third memory storing instructions that, when executed by the third processor, cause the third processor to: receive the partial 3-D model representing the first portion of the first object from the first camera group; receive the partial 3-D model representing the second portion of the first object from the first camera group; and combine data from the partial 3-D model representing the first portion of the first object and the partial 3-D model representing the second portion of the first object.

The third memory may further store: a first buffer configured to store data from the first camera group; a second buffer configured to store data from the second camera group; and instructions that, when executed by the third processor, cause the third processor to: detect when the first buffer and the second buffer both store data corresponding to the first object; and combine the data from the first camera group representing the first portion of the first object with the data from the second camera group representing the second portion of the first object.

The instructions to combine the data from the first camera group representing the first portion of the first object with the data from the second camera group representing the second portion of the first object may include merging the partial 3-D model representing the first portion of the first object with the partial 3-D model representing the second portion of the first object.

The 3-D model may be a point cloud.

The 3-D model may be a mesh model.

Each of the depth cameras may include: a first invisible light two-dimensional (2-D) camera having a first optical axis and a first field of view; a second invisible light 2-D camera having a second optical axis substantially parallel to the first optical axis of the first invisible light 2-D camera and having a second field of view overlapping the first field of view of the first invisible light 2-D camera; a color 2-D camera having a third optical axis substantially parallel to the first optical axis of the first invisible light 2-D camera and having a third field of view overlapping the first field of view of the first invisible light 2-D camera; and a projection source configured to emit invisible light in a portion of the electromagnetic spectrum detectable by the first invisible light 2-D camera and the second invisible light 2-D camera.

According to one embodiment of the present invention, a method for acquiring three-dimensional (3-D) models of objects includes: controlling, by a processor, a first camera group including a first plurality of depth cameras having overlapping fields of view to simultaneously capture a first group of images of a first portion of a first object; computing, by the processor, a partial 3-D model representing the first portion of the first object; and detecting defects in the first object based on the partial 3-D model representing the first portion of the first object.

The first camera group may further include a first start trigger configured to detect the arrival of an object when the object enters the overlapping fields of view of the first depth cameras, and the method may further include controlling the first depth cameras of the first camera group to capture images of the object in response to receiving a triggering signal from the first start trigger.

The first camera group may further include a first stop trigger configured to detect the departure of the object from the overlapping fields of view of the first depth cameras, and the method may further include controlling the first depth cameras of the first camera group to cease capture of images of the object in response to receiving a triggering signal from the first stop trigger.

The first camera group may further include a first prepare trigger configured to detect the presence of the object before the object enters the overlapping fields of view of the first depth cameras, and the method may further include controlling the first depth cameras of the first camera group to prepare to capture of images of the object in response to receiving a triggering signal from the first prepare trigger.

The overlapping fields of view of the first depth cameras may be directed to a portion of a conveyor system configured to convey a plurality of objects, and the conveyor system may be configured to convey the objects to enter the overlapping fields of view of the first depth cameras one at a time.

The conveyor system may moves at a non-uniform speed and the objects may arrive within the overlapping fields of view of the first camera group at a plurality of different rates, the different rates including a maximum burst rate and an associated maximum burst time, and the first camera group may include a memory including a buffer having a size sufficient to store images of the objects arriving a maximum burst rate during the associated maximum burst time, the size being a function of at least a resolution of the first depth cameras and a frame rate of the first depth cameras.

The conveyor system may move at a non-uniform speed and the objects may arrive within the overlapping fields of view of the first camera group at a plurality of different rates, the first camera group may include a memory including a buffer configured to store images captured by the first depth cameras, and the method may further include: determining a current buffer occupancy of the buffer; determining whether the current buffer occupancy exceeds a threshold; in response to determining that the current buffer occupancy does not exceed the threshold, setting configuration parameters of the first camera group to a nominal capture quality; and in response to determining that the current buffer occupancy exceeds the threshold: determining a new quality level based on a plurality of configuration settings stored in the first memory, the current buffer occupancy, and a current rate of the plurality of different rates; and setting the configuration parameters of the first camera group to the new quality level.

The method may further include: controlling, by a second processor, a second camera group including a second plurality of depth cameras having overlapping fields of view to simultaneously capture a second group of images of a second portion of the first object, the second depth cameras being spaced apart from the first depth cameras; computing, by the second processor, a partial 3-D model representing the second portion of the first object; and detecting defects in the first object based on the partial 3-D model representing the second portion of the first object.

The method may further include: receiving, by a coordinating server, the partial 3-D model representing the first portion of the first object from the first camera group; receiving, by the coordinating server, the partial 3-D model representing the second portion of the first object from the first camera group; and combining, by the coordinating server, data from the partial 3-D model representing the first portion of the first object and the partial 3-D model representing the second portion of the first object.

The coordinating server may include: a first buffer configured to store data from the first camera group; and a second buffer configured to store data from the second camera group, the method may further include: detecting, by the coordinating server, when the first buffer and the second buffer both store data corresponding to the first object; and combining, by the coordinating server, the data from the first camera group representing the first portion of the first object with the data from the second camera group representing the second portion of the first object.

The combining the data from the first camera group representing the first portion of the first object with the data from the second camera group representing the second portion of the first object may include merging the partial 3-D model representing the first portion of the first object with the partial 3-D model representing the second portion of the first object.

The 3-D model may be a point cloud.

The 3-D model may be a mesh model.

Each of the depth cameras may include: a first invisible light two-dimensional (2-D) camera having a first optical axis and a first field of view; a second invisible light 2-D camera having a second optical axis substantially parallel to the first optical axis of the first invisible light 2-D camera and having a second field of view overlapping the first field of view of the first invisible light 2-D camera; a color 2-D camera having a third optical axis substantially parallel to the first optical axis of the first invisible light 2-D camera and having a third field of view overlapping the first field of view of the first invisible light 2-D camera; and a projection source configured to emit invisible light in a portion of the electromagnetic spectrum detectable by the first invisible light 2-D camera and the second invisible light 2-D camera.

BRIEF DESCRIPTION OF THE DRAWINGS

Aspects of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1A:
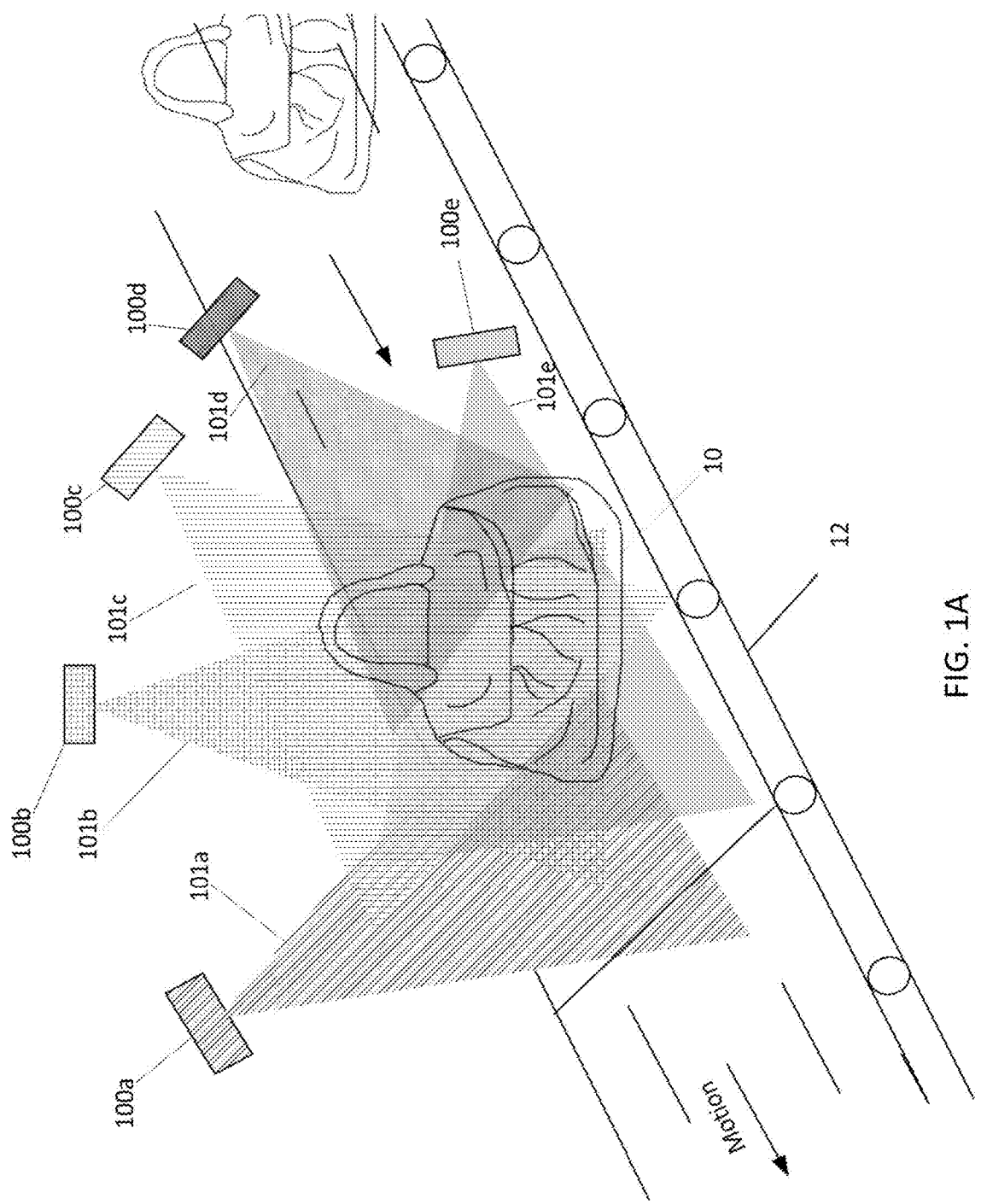
FIG. 1A is a schematic depiction of an object (depicted as a handbag) traveling on a conveyor belt with a plurality of (five) cameras concurrently imaging the object according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present invention relate to systems and methods for acquiring three-dimensional (3-D) data about objects, such as a 3-D scan of the physical shape and surface texture (e.g., colors) of an object, which may be used to generate a 3-D model of the object. Aspects of embodiments of the present invention also relate to systems and methods for coordinating multiple camera systems to capture multiple views of an object and to combine the data captured by the different camera systems to construct a 3-D model of the object. The captured 3-D data can be used for visual analysis of the objects, such as classifying the object and detecting defects in the object.

In order to capture a complete view an object, whether using two-dimensional camera systems or three-dimensional camera systems, the camera system generally needs to capture all of the of the externally visible surfaces of the object. This can typically be achieved by keeping the camera in place while rotating the object in front of the camera, moving the camera around the object, or combinations thereof. See, for example U.S. Pat. No. 9,912,862, "SYSTEM AND METHOD FOR ASSISTED 3D SCANNING," issued on Mar. 6, 2018, the entire disclosure of which is incorporated by reference herein. In some circumstances, views from multiple different camera systems can be combined to capture sufficient views of the object. See, for example, U.S. patent application Ser. No. 15/866,217, "SYSTEMS AND METHODS FOR DEFECT DETECTION," filed in the United States Patent and Trademark Office on Jan. 9, 2018, the entire disclosure of which is incorporated by reference herein. Techniques for synthesizing depth images from multiple images are described, for example, in Hartley, Richard, and Andrew Zisserman. Multiple View Geometry In Computer Vision. Cambridge University Press, 2003 and R. Szeliski. "Computer Vision: Algorithms and Applications", Springer, 2010 pp. 467 et seq. For the sake of convenience, the discussion of capturing a complete view of an object excludes a detailed discussion of capturing a bottom surface of the object, which is typically occluded by the surface supporting the object. However, embodiments of the present invention are not limited thereto and may encompass scanning systems that capture the bottom surfaces of objects.

In some environments, physical constraints and temporal constraints can limit the manner in which objects can be scanned. For example, in the context of a factory or other manufacturing process, objects may move along a conveyor system, where the objects (products) are modified or processed by people working at workstations and/or automated machinery. The placement of the existing workstations and the arrangement of the existing machinery may impose physical constraints on the placement of cameras for unobstructed imaging the objects without interfering with the manufacturing process. In addition, in order to avoid slowing down the existing process, a scanning system may capture its scans of the objects at rates imposed by the flow rate of the manufacturing line.

For the sake of convenience, embodiments of the present invention will be described in the context of manufacturing a product in a factory. Furthermore, aspects of embodiments of the present invention are described in the context of detecting defects in the objects using the captured 3-D models of the object. However, embodiments of the present invention are not limited thereto and may also be applied in other contexts and for performing other types of analysis. These contexts may involve similar physical constraints and temporal constraints lead to circumstances where embodiments of the present invention may solve data acquisition problems caused by such constraints. Examples include scanning produce at a food processing plant to classify the produce (e.g., assign grades) and scanning packages in a distribution or shipping center (e.g., to identify and route the packages).

FIG. 1A is a schematic depiction of an object 10 (depicted as a handbag) traveling on a conveyor belt 12 with a plurality of (five) depth cameras 100 (labeled 100a, 100b, 100c, 100d, and 100e) concurrently imaging the object 10 according to one embodiment of the present invention. For the sake of convenience, the depth cameras 100 will be referred to herein as "cameras" 100. The fields of view 101 of the cameras (labeled 101a, 101b, 101c, 101d, and 101e) are depicted as triangles with different shadings, and illustrate the different views (e.g., surfaces) of the object 10 that are captured by the cameras 100. For the sake of convenience of depiction, the fields of view are represented as triangles, in the generic case of depth cameras such fields of view might also be characterized approximately by a pyramidal shape. The cameras 100 may include both color and infrared (IR) imaging units to capture both geometric and texture properties of the object (e.g., the cameras may be stereoscopic depth cameras, such as the cameras described in U.S. patent application Ser. No. 15/147,879 "Depth Perceptive Trinocular Camera System," filed in the United States Patent and Trademark Office on May 5, 2016, issued on Jun. 6, 2017 as U.S. Pat. No. 9,674,504). Each individual depth camera 100 may include at least two image sensors and corresponding optical systems configured to focus light onto their respective image sensors. The optical axes of the optical systems may be substantially parallel, such that the two image sensors capture a "stereoscopic pair" of images (e.g., two images of the same scene, taken from slightly different viewpoints, where the viewpoints are separated by baseline distance). Each camera may include one or more computing units such as, but not limited to, Computing Processing Units (CPUs), Graphics Processing Units (GPUs), Digital Signal Processors (DSPs), Field-Programmable-Gate-Arrays (FPGAs) and Application-Specific-Integrated-Circuits (ASICs). One example of a depth camera 100 will be described in more detail below with reference to FIG. 2B.

The cameras 100 may be arranged around the conveyor belt 12 such that they do not obstruct the movement of the object 10 as the object moves along the conveyer belt 12. The camera arrangement may be generated as the result of a configuration process or an optimization process, in which the model of the target object(s), as well as the model of the motion on the conveyor belt is taken into account in order to obtain at least a minimum level of accuracy and completeness in the resulting 3-D model. Examples of considerations for coverage can be found, for example, in U.S. patent application Ser. No. 15/866,217, "SYSTEMS AND METHODS FOR DEFECT DETECTION," filed in the United States Patent and Trademark Office on Jan. 9, 2018, the entire disclosure of which is incorporated by reference herein. Some factors include the desired resolution of the resulting scan, the sizes of the smallest surface features of the object desired to be detected (e.g., the size of the smallest defects), the resolution of the individual depth cameras 100, the focal length of the cameras, the light available in the environment, and the speed of movement of the objects.

The cameras may be stationary and configured to capture images when at least a portion of the object 10 enters their respective fields of view (FOVs) 101. The cameras 100 may be arranged such that the combined FOVs 101 of cameras cover all critical (e.g., visible) surfaces of the object 10 as it moves along the conveyor belt 12 and at a resolution appropriate for the purpose of the captured 3-D model (e.g., with more detail around the stitching that attaches the handle to the bag). The captured images may then be used to synthesize a 3-D model of the object 10.

As noted above, in some circumstances, physical constraints hinder or prevent the installation of a camera system (or a set of cameras) that can cover all critical surfaces of the object 10 at a single location. For example, in a manufacturing line, existing equipment or space allocated for human employees to work on the objects 10 may take up a significant amount of space around a conveyor belt, leaving only a few places available for the placement of cameras. Furthermore, these remaining places may not allow for cameras to fully surround the object, thereby hindering the ability to capture all critical surfaces of the object substantially simultaneously in one location (e.g., at one point in the manufacturing line).

For the sake of convenience, the term "critical surfaces" will be used to refer to all surfaces of the object that are of interest to the scan. In more detail, for the purposes of defect detection, the critical surfaces may include particular parts of the object that are susceptible to failure, such as the seams of a handbag, where the quality of the stitching and the alignment of the fabric may be of particular interest, or the stitching associated with the attachment of a zipper or handles.

Accordingly, some embodiments of the present invention relate to a 3-D data acquisition system in which multiple camera groups are spaced apart from each other along a manufacturing line. Each camera group may include multiple depth cameras (e.g., stereoscopic depth cameras), and the depth cameras of each group may be controlled together to capture, substantially simultaneously, images of a portion (e.g., subset of) the critical surfaces of the object 10. In some embodiments, the camera groups are arranged such that the combined fields of view of the cameras of all of the camera groups capture substantially all of the critical surfaces of the object. In some embodiments, the fields of view of different camera groups do not overlap or are non-overlapping with one another.

Figure 1B:
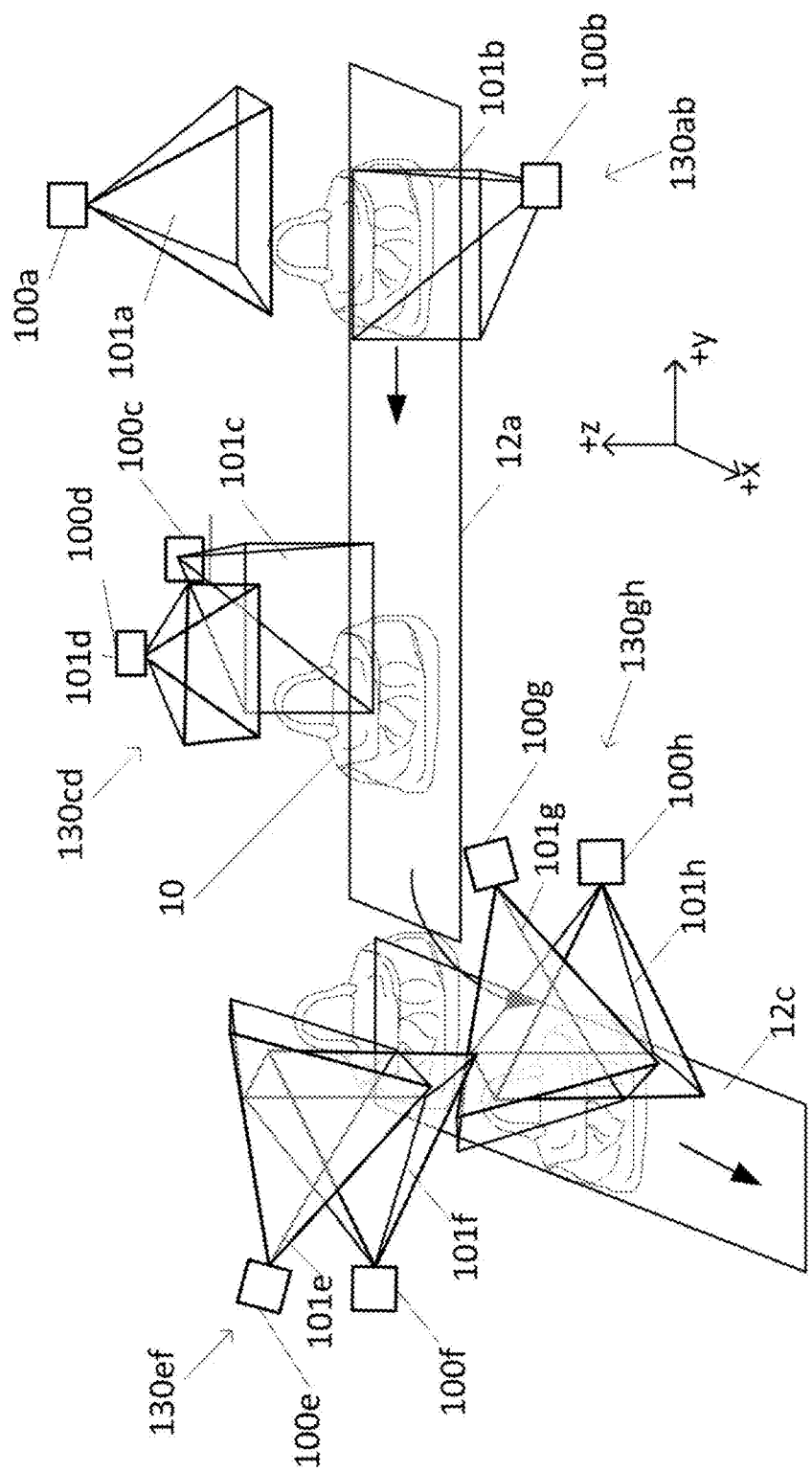
FIG. 1B is a schematic depiction of an object (depicted as a handbag) traveling on a conveyor belt having two portions, where the first portion moves the object along a first direction and the second portion moves the object along a second direction that is orthogonal to the first direction in accordance with one embodiment of the present invention.

As one example of an arrangement of cameras, FIG. 1B is a schematic depiction of objects 10 (depicted as handbags) traveling on a conveyor belt 12 having two portions, where the first portion 12a of the conveyor belt 12 moves the objects 10 along a first direction (the −y direction) and the second portion 12b of the conveyor belt 12 moves the object 10 along a second direction (the +x direction) that is orthogonal to the first direction in accordance with one embodiment of the present invention. When the object 10 travels along the first portion 12a of the conveyor belt 12, at a first location, a first camera 100a images the top (+z) surface of the object 10 from above, while a second camera 100b images the +x side of the object. The first camera 100a and the second camera 100b may make up a first camera group 130ab. At a second location on the first portion 12a of the conveyor belt, third and fourth cameras 100c and 100d of a second camera group 130cd image a −x side of the objects 10.

In this arrangement, it may be difficult to image the ends of the object 10 because doing so would require placing the cameras along the direction of movement of the conveyor belt and therefore may obstruct the movement of the objects 10. As such, the object 10 may transition (without rotating) to the second portion 12b of the conveyor belt 12, where, after the transition, the −y side of the object 10 is now visible to cameras 100e and 100f of a third camera group 130ef at a third location. At a fourth location, cameras 100g and 100h of a fourth camera group 130gh image a +y side of the object. Assuming that the cameras 100 of the camera groups 130 are substantially stationary and that the objects move along the conveyor system without rotating, each the cameras may capture multiple images of the objects as the objects pass by.

As such, FIG. 1B illustrates an example of an arrangement of camera groups 130 that allows coverage of the entire visible surface of the object 10. In some embodiments of the present invention, the data captured by the cameras of the different camera groups 130 is combined to synthesize a single 3-D model of the object (e.g., a global model of the entire object 10). In some embodiments, the data captured by each of the camera groups 130 is processed separately (e.g., to generate several separate 3-D models) without combining all of the captured data into a single "global" 3-D model.

While FIG. 1B depicts the camera groups as being adjacent to one another, in many circumstances, the camera groups may be separated by significant distances, such as with one or more work stations located between the camera groups. Manufacturing equipment and/or people may perform tasks on the objects at each of these work stations. Thus, the different camera groups may capture images of the products in different states (e.g., different stages of assembly). In some embodiments, the camera groups are arranged such that they capture only the portions of the objects that are expected to be finalized or complete (for a particular stage of manufacturing) at the particular location. Accordingly, the flow of objects along the manufacturing line may be non-uniform. For example, in some processes, items may be processed serially (e.g., one at a time) and periodically subjected to a batch operation (e.g., multiple items may be grouped together and simultaneously), before resuming a serial operation, thereby potentially resulting in "pulses" of objects. As another example, a problem may arise at one work station, which may temporarily hold a number of objects while the problem is resolved, and then release all of the held objects at once, thereby resulting in occasional bursts of objects. Likewise, the temporary hold at one workstation may cause a corresponding drop in the rate of arrival of objects in downstream workstations of the manufacturing line.

Accordingly, a significant amount of time may elapse between the capture of data by an earlier camera group and the capture of data by a later camera group, thereby delaying the synthesis of a 3-D model of the object from the captured data. In addition to the latency between the time at which a particular object is seen by one camera group and the same object is seen by another camera group, the throughput of the manufacturing line may also mean that the earlier camera group will capture data of many additional objects before the particular object arrives at the later camera group. As such, data captured by earlier camera groups may need to be buffered in order to be combined with later-captured data of the same object.

Camera Groups

Figure 2A:
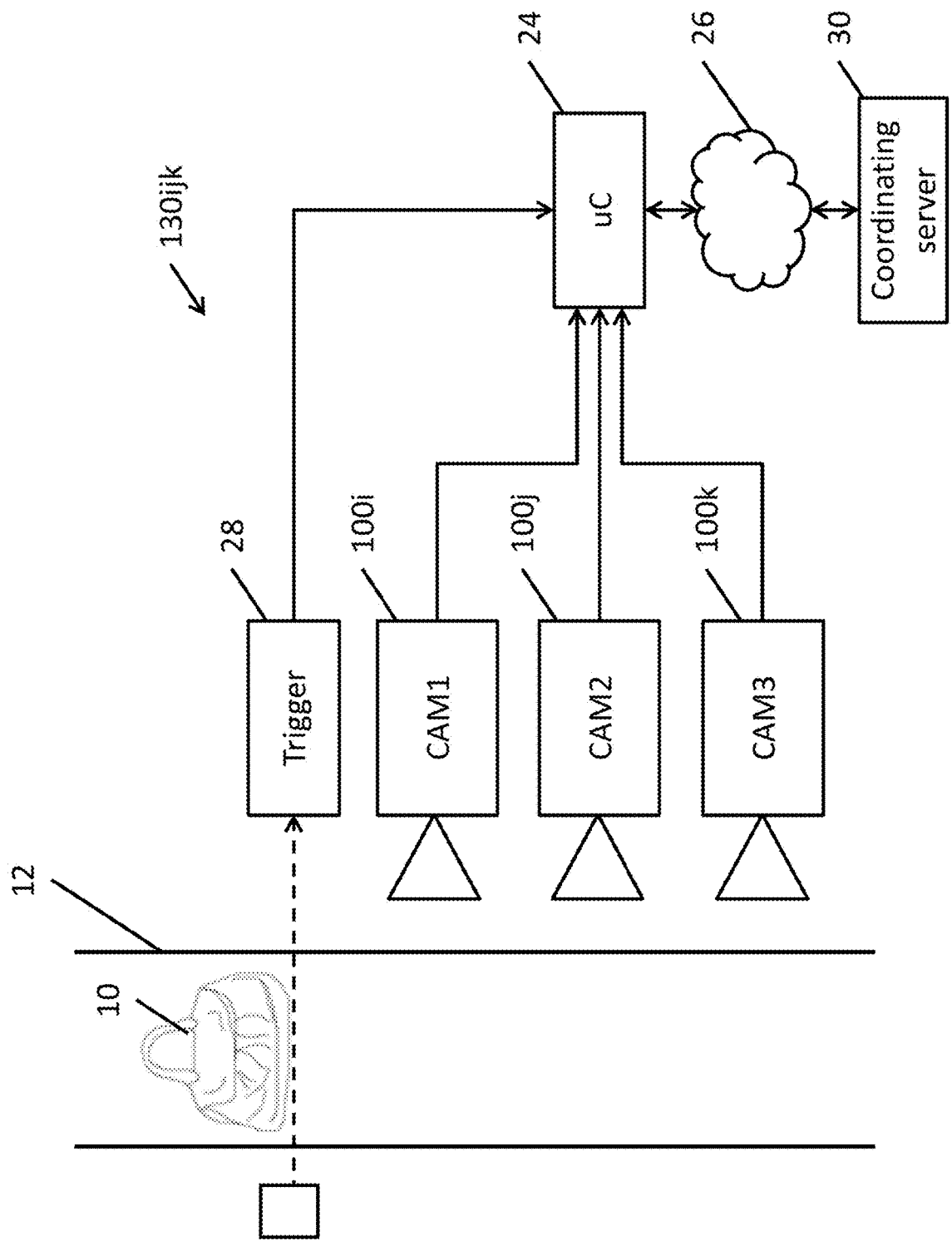
FIG. 2A is a schematic diagram of a camera group according to one embodiment of the present invention.
Figure 2B:
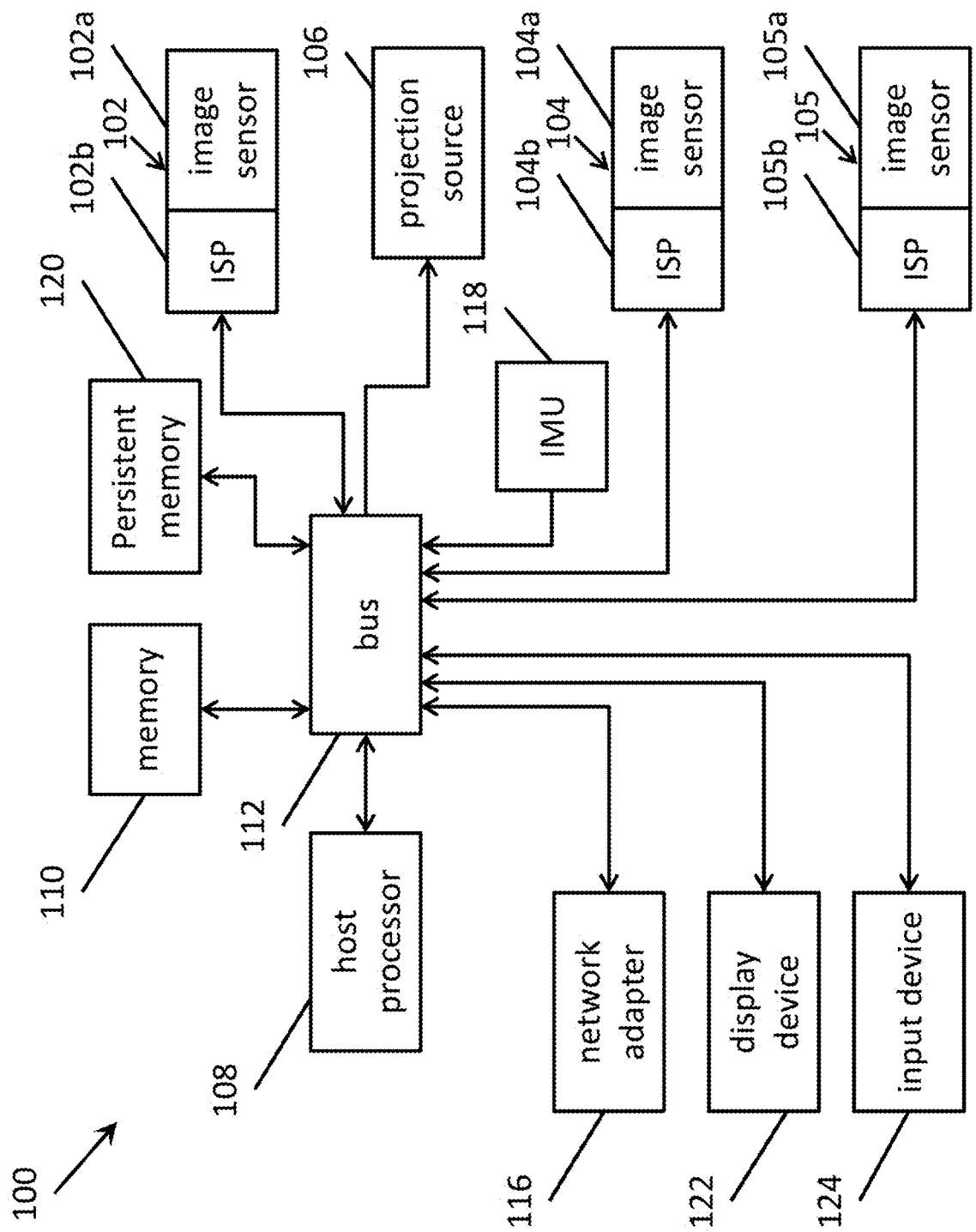
FIG. 2B is a schematic diagram of a depth camera suitable for use in a camera group according to one embodiment of the present invention.

FIG. 2A is a schematic diagram of a camera group 130ijk according to one embodiment of the present invention. As shown in FIG. 2A, three cameras CAM1, CAM2, and CAM3 (respectively labeled 100i, 100j, and 100k) are configured to capture overlapping images different portions of objects 10 on conveyor system 12. The capture of images may be triggered by a triggering system, which may include a start trigger 28, which detects when an object 10 has entered the fields of view of the cameras 100i, 100j, and 100k. The start trigger 28 of the triggering system may include a laser emitter that is configured to send a triggering signal to a controller 24 (e.g., a computer or microcontroller) when the laser signal is interrupted by the presence of the object 10. The controller 24 may then control the cameras 100i, 100j, and 100k to begin capturing images of the object. In some embodiments of the present invention, the camera group 130ijk may include multiple triggers (see FIG. 5), such as an additional trigger to detect when the object has left the fields of view of the cameras 100i, 100j, and 100k (a stop trigger), and/or a trigger to detect when an object 10 is approaching the camera group 130ijk, thereby allowing the camera group 130ijk to perform setup or initialization operations prior to the arrival of the object (a prepare trigger). The cameras 100i, 100j, and 100k may be connected to the controller 24 through a peripheral interface base, such as universal serial bus (USB). In some other embodiments, the trigger can be obtained directly from imaging information acquired by one or more cameras in the group, such as by processing the captured image data at a lower resolution and/or by exploiting a proximity sensor or an additional illumination source.

The controller 24 may also be connected to a network 26 (e.g., an Ethernet 802.3 network or wireless LAN 802.11 network) to communicate with other devices, such as a coordinating server computer 30 and/or other camera groups 130. For example, the data captured by the cameras 100i, 100j, and 100k may be transferred to the coordinating server 30 through the network 26.

The various computing devices described herein, including the controller 24 and the coordinating server 30 may include one or more processors (e.g., central processing units, graphics processing units, field programmable gate arrays, and application specific integrated circuits) coupled with memory (e.g., dynamic memory and/or persistent memory) storing instructions that configure the computing devices to perform particular specific functions as described herein. The one or more processors may communicate with other devices, such as the cameras 100, through peripheral input/output devices such as network adapters and universal serial bus (USB) controllers.

Depth Camera Hardware

In some embodiments of the present invention, the depth cameras 100, also known as "range cameras," include at least two standard two-dimensional cameras that have overlapping fields of view. In more detail, these two-dimensional (2-D) cameras may each include a digital image sensor such as a complementary metal oxide semiconductor (CMOS) image sensor or a charge coupled device (CCD) image sensor and an optical system (e.g., one or more lenses) configured to focus light onto the image sensor. The optical axes of the optical systems of the 2-D cameras may be substantially parallel such that the two cameras image substantially the same scene, albeit from slightly different perspectives. Accordingly, due to parallax, portions of a scene that are farther from the cameras will appear in substantially the same place in the images captured by the two cameras, whereas portions of a scene that are closer to the cameras will appear in different positions.

Using a geometrically calibrated depth camera, it is possible to identify the 3-D locations of all visible points on the surface of the object with respect to a reference coordinate system (e.g., a coordinate system having its origin at the depth camera). Thus, a range image or depth image captured by a range camera 100 can be represented as a "cloud" of 3-D points, which can be used to describe the portion of the surface of the object (as well as other surfaces within the field of view of the depth camera).

FIG. 2 is a block diagram of a stereo depth camera system according to one embodiment of the present invention. The depth camera system 100 shown in FIG. 2 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The depth camera system 100 may include additional components such as a network adapter 116 to communicate with other devices, an inertial measurement unit (IMU) 118 such as a gyroscope to detect acceleration of the depth camera 100 (e.g., detecting the direction of gravity to determine orientation), and persistent memory 120 such as NAND flash memory for storing data collected and processed by the depth camera system 100. The IMU 118 may be of the type commonly found in many modern smartphones. The image capture system may also include other communication components, such as a universal serial bus (USB) interface controller. In some embodiments, the depth camera system 100 further includes a display device 122 and one or more user input devices 124 (e.g., a touch sensitive panel of the display device 122 and/or one or more physical buttons or triggers).

Although the block diagram shown in FIG. 2 depicts a depth camera 100 as including two cameras 102 and 104 coupled to a host processor 108, memory 110, network adapter 116, IMU 118, and persistent memory 120, embodiments of the present invention are not limited thereto. For example, the three depth cameras 100 shown in FIG. 6 (described in more detail below) may each merely include cameras 102 and 104, projection source 106, and a communication component (e.g., a USB connection or a network adapter 116), and processing the two-dimensional images captured by the cameras 102 and 104 of the three depth cameras 100 may be performed by a shared processor or shared collection of processors in communication with the depth cameras 100 using their respective communication components or network adapters 116. For example, controller 24 of FIG. 2A may be used to process 2-D images received from cameras 100i, 100j, and 100k to generate three separate depth images corresponding to views captured by cameras 100i, 100j, and 100k.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors (e.g., RGB sensors). In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors. In some embodiments of the present invention, the image sensors 102a and 104a are infrared light (IR) sensors. In some embodiments (such as those in which the image sensors 102a and 104a are IR sensors) the depth camera 100 may include a third camera 105 including a color image sensor 105a (e.g., an image sensor configured to detect visible light in the red, green, and blue wavelengths, such as an image sensor arranged in a Bayer layout or RGBG layout) and an image signal processor 105b.

In some embodiments in which the depth cameras 100 include color image sensors (e.g., RGB sensors or RGB-IR sensors), the color image data collected by the depth cameras 100 may supplement the color image data captured by the color cameras 150. In addition, in some embodiments in which the depth cameras 100 include color image sensors (e.g., RGB sensors or RGB-IR sensors), the color cameras 150 may be omitted from the system.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, and first/second are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. Pat. No. 9,674,504 "Depth Perceptive Trinocular Camera System" issued on Jun. 6, 2017, the entire disclosure of which is incorporated by reference herein. Such a three camera system may also include an infrared illuminator configured to emit light in a wavelength interval that is detectable by the infrared cameras (e.g., 840-860 nm).

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3-D point in the scene projects onto the same scanline index in the master and in the slave image. Let $u_m$ and $u_s$ be the coordinates on the scanline of the image of the same 3-D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3-D point with respect to the rectified cameras (that is, the length of the orthogonal projection of the point onto the optical axis of either camera).

Stereoscopic algorithms exploit this property of the disparity. These algorithms achieve 3-D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3-D details such as the one described in U.S. Pat. No. 9,392,262 "System and Method for 3-D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104, where the emitted light is in a portion of the electromagnetic spectrum that is detectable by the cameras 102 and 104 (for example, when the cameras 102 and 104 are invisible light or infrared cameras, the projection source 106 projects light in the invisible light or infrared portion of the electromagnetic spectrum). Arrangements in which two cameras 102 and 104 are arranged with a projection source 106 in this manner is sometimes referred to as "active stereo." In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. Pat. No. 9,516,295 "Systems and Methods for Multi-Channel Imaging Based on Multiple Exposure Settings," issued on Dec. 6, 2016, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

Depth computations may fail in some region areas due to multiple factors, including: the mechanism used to compute depth (triangulation, with or without an active illuminator, or time of flight); the geometry of the scene (such as the angle between each surface element and the associated line of sight, or the presence of partial occlusion which may impede view by either sensor in a stereo system); and the reflectivity characteristics of the surface (such as the presence of a specular component which may hinder stereo matching or reflect away light from a projector, or a very low albedo causing insufficient light reflected by the surface). For those pixels of the depth image where depth computation fails or is unreliable, only color information may be available.

Although embodiments of the present invention are described herein with respect to stereo depth camera systems, embodiments of the present invention are not limited thereto and may also be used with other depth camera systems such as structured light time of flight cameras and LIDAR cameras.

Depending on the choice of camera, different techniques may be used to generate the 3-D model. For example, Dense Tracking and Mapping in Real Time (DTAM) uses color cues for scanning and Simultaneous Localization and Mapping (SLAM) uses depth data (or a combination of depth and color data) to generate the 3-D model.

Figure 3A:
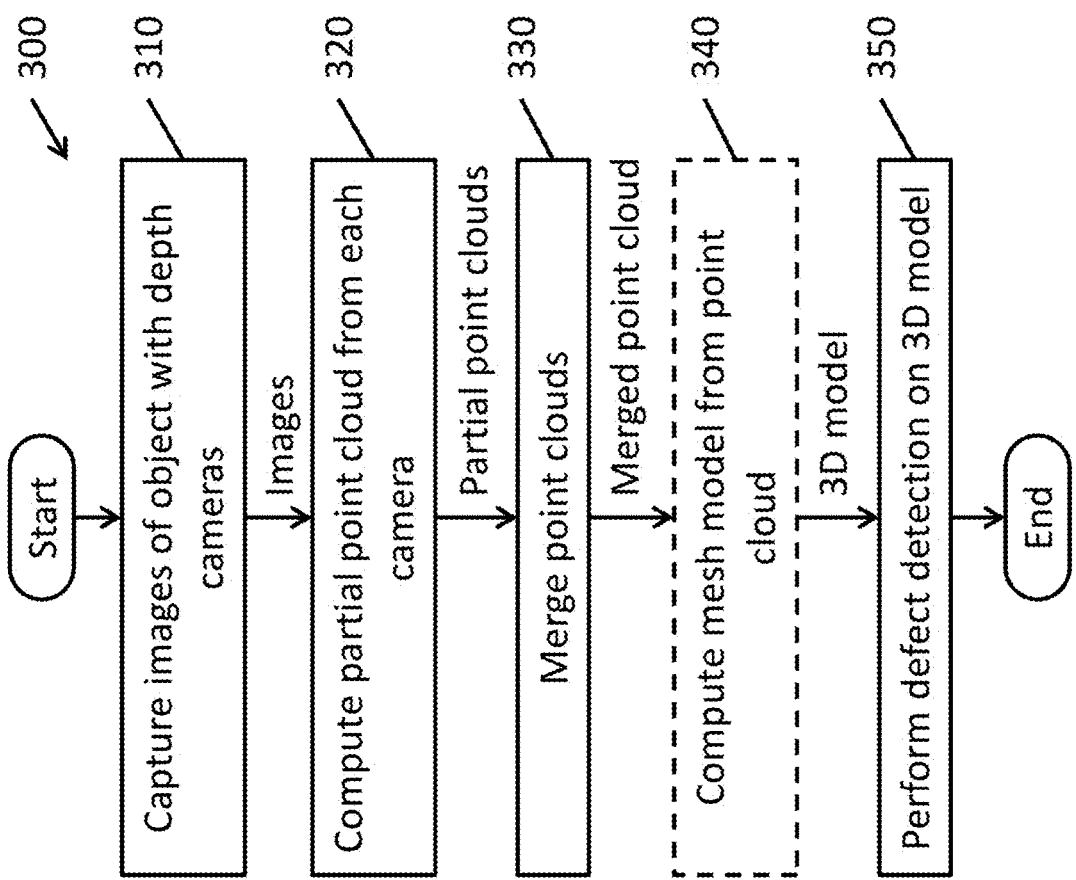
FIG. 3A is a flowchart illustrating some of the stages of synthesizing a 3-D model according to one embodiment of the present invention.

Generally, the process of computing a 3-D model from images captured by cameras includes several processing stages. FIG. 3A is a flowchart illustrating some of the stages of synthesizing a 3-D model according to one embodiment of the present invention. Referring to FIG. 3A, in operation 310, the cameras 100 of the camera groups 130 are controlled to capture images (e.g., 2-D images captured by the individual 2-D cameras 102, 104, and 105 of the depth cameras 100) of the object 10. In some embodiments of the present invention, the controller 24 associated with the camera group 130 controls the cameras 100 of a camera group to capture images substantially simultaneously (e.g., in accordance with detecting the presence of the object 10 using the triggering system 28, and, in some embodiments, using a synchronization signal sent by the controller 24 to synchronize the capture of individual frames by the cameras 100).

The data captured by each of the depth cameras 100 is used in operation 320 by a point cloud generation module to generate a partial point cloud representing the shape of the object 10 as captured from the pose or viewpoint of the corresponding depth camera 100. For example, each depth camera 100 may include at least one stereoscopic pair of cameras (e.g., 2-D cameras 102, 104, and 105). Block matching may be used to match features in the pair of images captured by the stereoscopic pair, and the matching blocks may be used to compute a disparity map, which is used to compute a point cloud. In some embodiments, each of the depth cameras 100 includes the point cloud generation module. For example, a point cloud generation module may be implemented in software stored in the memory 110 and/or persistent memory 120 of the depth camera 100 and executed by the host processor 108 of the depth camera 100, such that each depth camera 100 computes the partial point cloud corresponding to its view of the object, as captured by its corresponding 2-D cameras 102, 104, and 105.

In one embodiment, a point cloud merging module merges the separate partial point clouds in operation 330 to generate a merged point cloud of the entire object 10. Assuming that the poses of the cameras 100 within a camera group 130 respect to one another is known (the cameras are "calibrated"), that the cameras are synchronized (e.g., are controlled to capture images substantially simultaneously), and that there is precise time-stamping of the images captured by the cameras, then the necessary rigid transformations to map the point clouds captured by the separate depth cameras 100 into a consistent coordinate system is known and straightforward. (In the case of uncalibrated systems, iterative closest point or ICP may be used to align the point clouds.)

In some embodiments, in operation 340, a 3-D mesh model generation module generates a 3-D mesh model from the merged point cloud. In some embodiments, the 3-D model is a 3-D mesh model. Examples of techniques for converting a point cloud to a 3-D mesh model include Delaunay triangulation and a-shapes to connect neighboring points of the point clouds using the sides of triangles. In some embodiments, the MeshLab software package is used to convert the point cloud to a 3-D mesh model (see, e.g., P. Cignoni, M. Callieri, M. Corsini, M. Dellepiane, F. Ganovelli, G. Ranzuglia MeshLab: an Open-Source Mesh Processing Tool Sixth Eurographics Italian Chapter Conference, pages 129-136, 2008.). In some embodiments, operation 340 is omitted, and the merged point cloud is considered to be the generated 3-D model.

In operation 350, defect detection may be performed on the merged point cloud or, if operation 340 was performed, on the resulting 3-D model. In some embodiments, the computed 3-D model may be compared against a reference 3-D model of the object. In some embodiments, the 3-D model can also include additional reflectivity information such as bi-directional reflectance function (BDRF). For additional detail on defect detection, see, for example, U.S. patent application Ser. No. 15/866,217, "SYSTEMS AND METHODS FOR DEFECT DETECTION," filed in the United States Patent and Trademark Office on Jan. 9, 2018. Additional examples of techniques for defect detection include supplying the captured 3-D model to a neural network trained to detect defects. Such a neural network may be, for example, a deep neural network including one or more convolutional layers. The supplying of the captured 3-D model to the neural network may include rendering multiple views of the 3-D model (e.g., rendering 2-D views) and pooling the feature vectors computed from the separate views (e.g., using max-pooling).

Each of the operations shown in FIG. 3A may incur some level of processing time or processing latency. For example, for one combination of computing hardware, number of cameras, and resolution of the cameras 100, capturing images of the object with the depth cameras in operation 310 may take about 3 seconds and computing the point clouds in operation 320, merging the point clouds in operation 330, and detecting defects in operation 350 may each take about 10 seconds. Accordingly, the processing latency for detecting defects in a single object using such a system may be about thirty-three seconds. Furthermore, transferring the raw captured data and the computed 3-D models and/or the merged point cloud over a network may take about 10 seconds. These particular numbers are given as representative examples based on current technology.

In view of this thirty-three second processing time, and assuming that the operations are performed locally by the controller 24 of the camera group 130 and that these operations are pipelined across multiple cores of a multi-core processor, the camera group 130 is limited to a throughput of scanning a little less than two objects per minute. (In other words, the rate of arrival of objects 10 within the field of view of the system would need to be less than two objects per minute.)

However, as noted above, in many manufacturing settings, the conveyor system of a manufacturing line may move at a non-uniform speed, as the line may slow or stop based on problems at particular work stations, shift changes, staff breaks, and the like, and the line may temporarily speed up to make up for lost time and/or clear buffers of objects. The average rate of arrival of objects at a camera group, as well as the variance and maximum values of the arrival rate, impose timing constraints on the data acquisition and processing system.

While these processing times apply for one particular choice of image capture resolution, the same overall latency issues will generally apply for other choices of hardware. Particular combinations of hardware may be selected based on the timing constraints of the particular application (e.g., the average arrival rate of the particular manufacturing line). For example, the capture time may change based on the frame rate of the cameras (e.g., capturing a sufficient number of images of the object) and the speed of the conveyor system (e.g., the amount of time the object is in the fields of view of the cameras), and the processing speed may increase or decrease with less powerful or more powerful computers (e.g., faster processors, more specialized processors, multiple processing cores, etc.) and with higher or lower resolution cameras. In addition, different combinations and configuration of the pipelining can be used to accommodate higher average throughput.

In order to handle temporary bursts of objects, the controllers 24 of camera groups 130 according to some embodiments of the present invention include buffer memory for storing or queueing data during bursts of high object throughput. In some embodiments, the size of the buffer memory of the controller 24 may be set based on the maximum burst rates (and associated amount of burst time that the maximum burst rate can be sustained) of the manufacturing line and the size of the data captured by the cameras and generated by the controller 24 (e.g., the size of the point clouds). These buffer memories store, for example, the 2-D image data captured by the 2-D cameras of the depth camera 100 while computations related to earlier captures (e.g., images of previous objects) are analyzed in accordance with FIG. 3A (e.g., to compute point clouds, to merge the point clouds, to perform defect detection, etc.). After the processing time is once again faster than the time between objects, then the scanning system can recover by processing the data queued in the buffer.

In some embodiments of the present invention, when the buffer memory is insufficient to store all of the collected data during a burst, best effort attempts may be made to preserve at least some of the data. Circumstances in which the buffer memory may not have enough space include situations in which: the network connection goes offline and data cannot be transferred off the controller 24; objects arrive at a much higher rate than expected; hardware failure (e.g., of a memory module); and the like. Best effort approaches to reduce the amount of data (e.g., degrade the quality of the output) may include: reducing a capture frame rate of the cameras, compressing the images acquired by the cameras (either with lossless or lossy compression), reducing a resolution of the point clouds (e.g., deleting points), and the like.

Different forms of quality degradation may result in different maximum throughput for the scanning system. For example, compressing the images may reduce the transfer time and therefore increase throughput, but the maximum throughput may still be limited due to the additional processing (e.g., CPU) overhead associated with the performing the compression by the controller 24. On the other hand, decreasing the capture frame rate of the camera may reduce the total processing load, but reducing a capture rate too much may result in a failure to capture some objects (e.g., objects that pass by between frames) or fail to some surfaces of the objects (e.g., if, in a typical capture mode, a camera group captured images of an object at three points in time, with slightly different poses with respect to the object, then data from all three poses would be available, whereas if the capture rate was reduced to a single point in time per object, then data from the other poses would not be available).

In addition, different particular applications may have different quality requirements for the scanning process. For example, detecting defects in certain parts of the object may be of higher importance (high-priority) than detecting defects in other, low-priority portions. Accordingly, the quality of the images captured of low-priority surfaces of the object can be degraded before degrading the quality of the images of the high-priority surfaces.

Figure 3B:
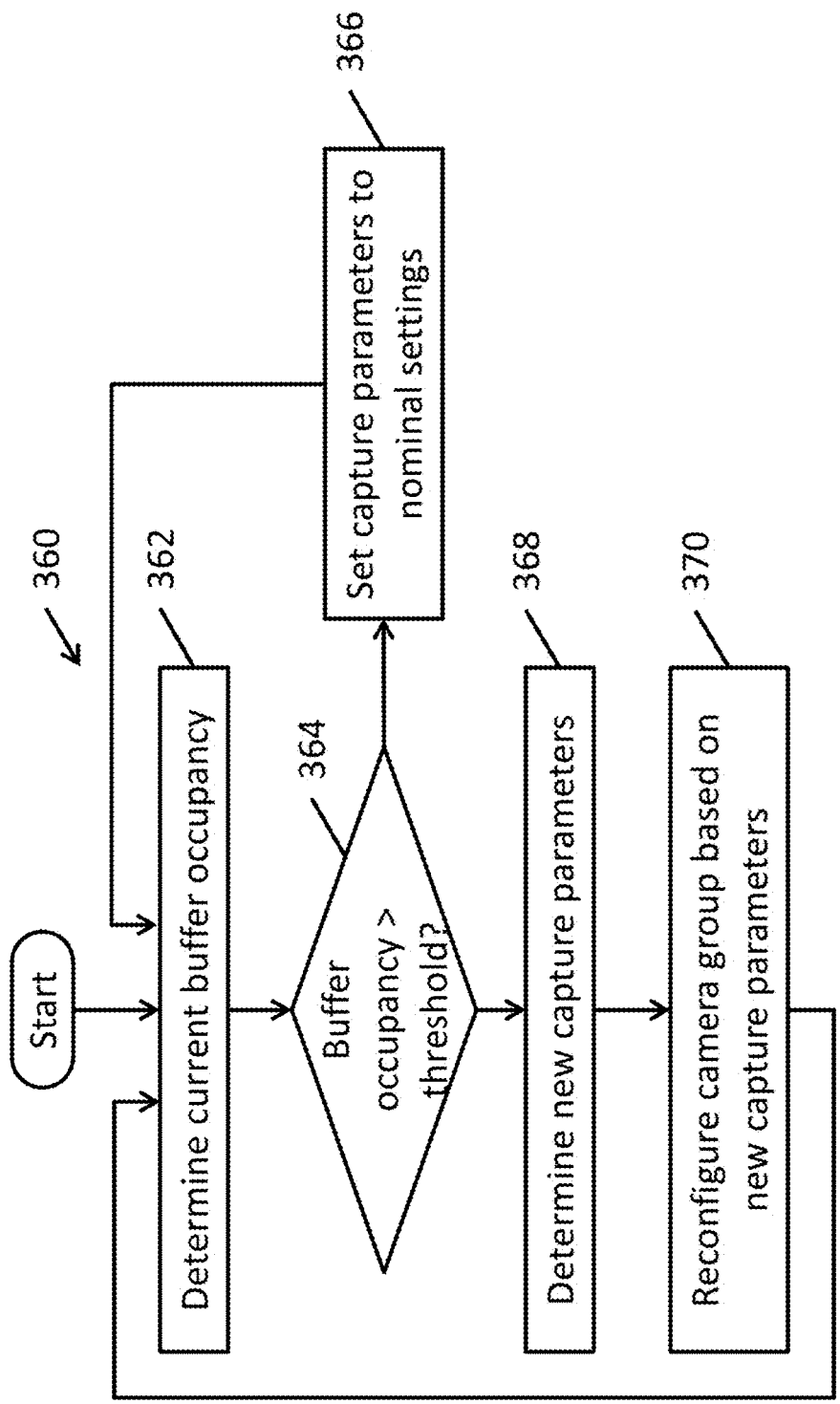
FIG. 3B is a flowchart illustrating a method for reducing the quality of a scanning process to continue scanning objects at a current throughput of the system.

FIG. 3B is a flowchart illustrating a method 360 for reducing the quality of a scanning process to continue scanning objects at a current throughput of the system. For the sake of convenience, the term "buffer occupancy" will be used herein to refer to the amount of data stored ("buffered") in a buffer of the system, where the amount may be represented in, for example, a number of bytes, a number of scans of objects, a percentage or fraction of the total buffer size, and the like. In operation 362, the controller 24 determines the current buffer occupancy, and in operation 364, the controller 24 (or the coordinating server computer 30) determines whether the buffer occupancy of a buffer exceeds a threshold level.

For example, in the case where the buffer occupancy is tracked as a number of scans of objects, the threshold may be determined based on the rate at which the current scans are processed and removed from the buffer, and the rate at which new scans are captured and determining that the buffer is likely to overflow (e.g., a write to the buffer will fail because the buffer has reached full capacity or full occupancy) soon based on current conditions. As a specific worked example if buffer currently stores scans of four different objects and has space for two more, and each scan take 30 seconds to be processed, and objects are arriving at a rate of one object every 15 seconds, then the buffer is likely to overflow in less than one minute. In some embodiments, the rate of arrival is estimated from the rate at which objects are processed by camera groups 130 earlier (e.g., "upstream") in the line.

As another example, when the threshold is set as a percentage, the threshold may be set as a particular percentage of the total buffer size, such as 60% of the buffer size. In some embodiments, this threshold is set in accordance with the designed variance in the arrival rate of objects in the line (the manufacturing line), such as by setting the threshold to accommodate two standard deviations in the rate of the line.

In response to determining that the threshold has not been exceeded, the controller 24 returns to normal or nominal capture quality in operation 366 and returns to check the current buffer occupancy of the buffer in operation 362.

In response to determining that the threshold has been exceeded, in operation 368 the controller 24 determines a new quality level at which to capture and/or process the scans of the objects 10 in order to maintain the throughput. The new quality level may be determined based on factors including the current buffer occupancy, the current arrival rate of objects, and the estimated future arrival rate of objects (e.g., estimated based on arrival rates measured at upstream camera groups 130). For example, reducing the resolution of the captured images reduces the amount of space consumed by each scan in the buffer (thereby allowing more scans of objects to be buffered) and also reduces the processing time due to less data needing to be processed to generate the partial point clouds.

In some embodiments of the present invention, the selection of particular ways to reduce the quality level of the scans is governed by the particular needs of the current application. For example, configuration settings (e.g., a configuration file stored in the memory or loaded from the configuration file) may specify mappings from input parameters including a current object arrival rate and a current buffer occupancy level to a set of configuration parameters for the camera group. As noted above, the configuration parameters control the quality of the scans captured by the camera group 130 and may include settings such as the resolution of the 2-D images captured by the individual 2-D cameras of at least some of the depth cameras 100 of the camera group 130, a frame rate (e.g., the number of frames of images that are captured by each depth camera 100 while the object is within the field of view of the camera group 130), the number of points and/or the density of points in the partial point clouds, whether or not a mesh model is generated from the point clouds, etc. The particular characteristics of the quality reduction may be specified when configuring the system based on the quality requirements or constraints set by the particular application of the scanning system (e.g., in a defect detection system, reduced quality may be more acceptable for low cost and easily replaceable components of objects than for high cost or difficult to replace components, and therefore the quality may be selectively reduced for scans of the low cost and easily replaceable components).

In operation 370, the controller 24 reconfigures the camera group 130 based on the determined configuration settings of the determined quality level (e.g., setting the capture resolutions or the frame rates of the individual depth cameras 100), and the process returns to continue monitoring the buffer occupancy in operation 362.

In some embodiments of the present invention, under some circumstances, the controller 24 addresses or mitigates a high buffer occupancy situation by decimating (e.g., reducing the amount of data, such as deleting points from the partial point clouds or deleting vertices from the mesh models) in scans that are already in the buffer. For example, in some embodiments, the controller reduces the resolution of data corresponding to a previously captured scan that is stored in the buffer, in some embodiments, lossless or lossy compression may be applied to the data stored in the buffers to reduce the size.

In some circumstances, the network connection will not provide sufficient bandwidth to transmit all of the data at a high enough rate, given the expected rate at which objects 10 arrive at the camera group along the conveyor belt. (For example, in some manufacturing environments, one object may pass by a camera group every 4 to 5 seconds. In other circumstances, an object may pass by a camera group, on average, once every minute.)

In some embodiments of the present invention, the multiple cameras 100 of a camera group 130 are synchronized with respect to a clock common to the entire system or to each camera group. In some embodiments, such synchronization is performed using ad-hoc wired connections exploiting F-sync or similar protocols, using wireless remote shutter techniques, exploiting broadband transmission, or using networking synchronization protocols such as the Precision-Time-Protocol (PTP).

Figure 4A:
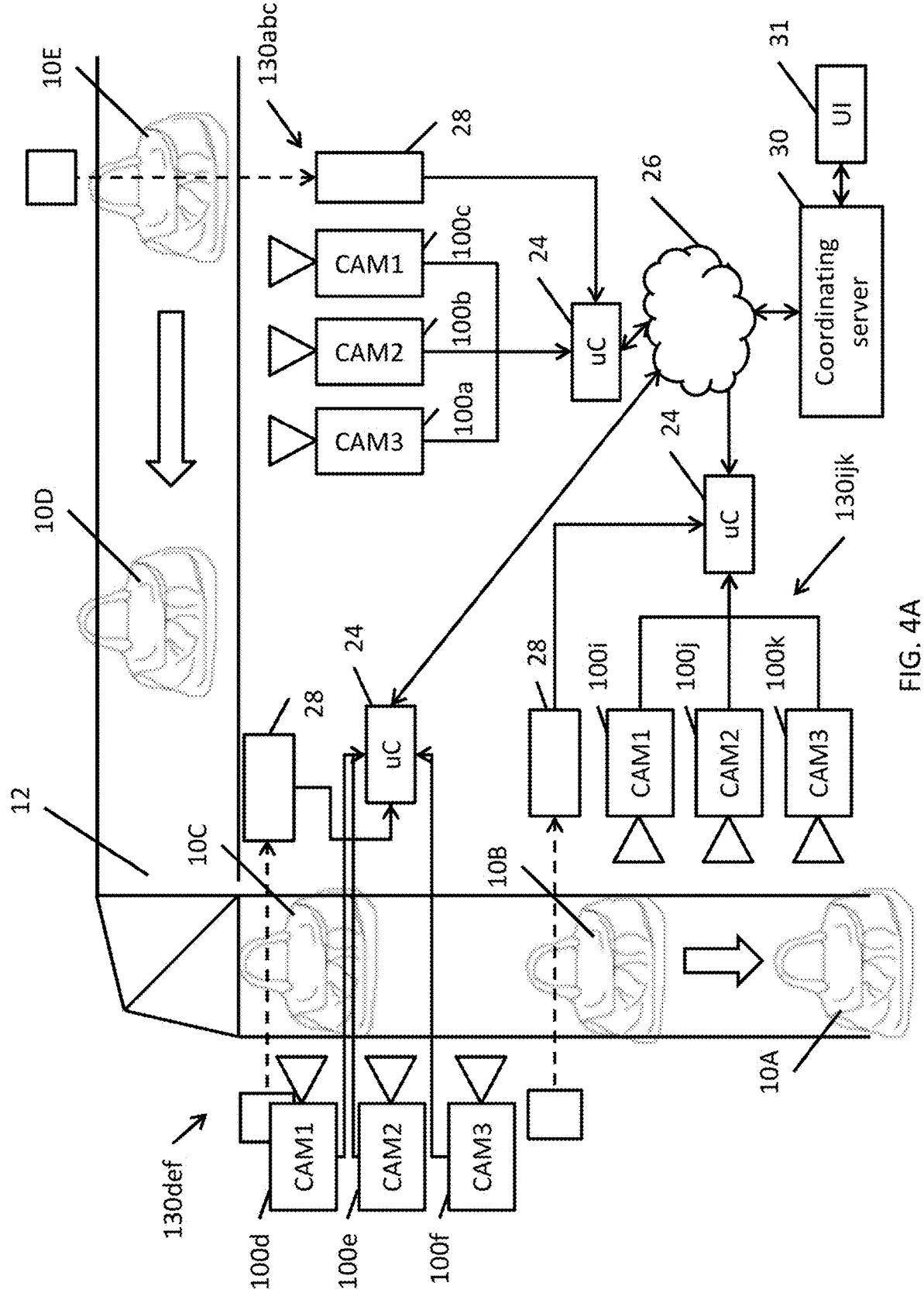
FIG. 4A is a schematic illustration of multiple camera groups in communication with a coordinating server according to one embodiment of the present invention.

In some embodiments of the present invention, a coordinating server 30 controls communicates with multiple camera groups 130. FIG. 4A is a schematic illustration of multiple camera groups 130 in communication with a coordinating server 30 according to one embodiment of the present invention. As seen in FIG. 4A, a first camera group 130*abc* may capture images of a first side (e.g., a front side) of the object 10, a second camera group 130*def* may capture a second side (e.g., left side) of the object 10, and a third camera group 130*ijk* may capture a third side (e.g., a right side) of the object 10. In various other embodiments, additional camera groups 130 may be used to capture additional sides of the object (e.g., a back side and a top side of the object).

In some embodiments of the present invention, the data captured by the separate camera groups 130 is combined at the coordinating server 30 to generate a 3-D model (e.g., a point cloud or a mesh model) of a larger portion of the object than captured by any one of the camera groups 130. In some embodiments, a full (or "global") 3-D model of the entire object is synthesized at the coordinating server 30. For example, each camera group 130 may transmit to the coordinating server 30: 3-D mesh models; computed point clouds; and/or the original captured 2-D images of portions of the object 10. Based on the type or types of data received from the camera groups 130, the coordinating server 30 may combine 3-D mesh models or 3-D point clouds created from the separate partial 3-D models (e.g., partial point clouds or partial mesh models) captured by the different camera groups 130. In one embodiment, a "chunk assembly" process is used to combine the separate partial 3-D models, which includes obtaining a rough alignment or registration of the partial 3-D models based on known poses of the cameras 100 of the different camera groups 130 with respect to the object 10 (as determined through an initial calibration process, see, e.g., FIG. 1B, where, due to the arrangement of the camera groups, camera group 130ab is known to image the +x and +z sides of the object 10, camera group 130cd is known to image the −x and +z/−x surfaces of the object 10, and camera groups 130ef and 130gh image the +y and −y surfaces of the object) and refining the alignment or registration using a technique such as iterative closest point). Additional techniques for aligning or registering separate chunks or partial 3-D models representing parts of a single object are described, for example, in U.S. patent application Ser. No. 15/630,715 "SYSTEM AND METHODS FOR SCANNING THREE-DIMENSIONAL OBJECTS," filed in the United States Patent and Trademark Office on Jun. 22, 2017, published as US Patent Application Publication No. 2017/0372527, the entire disclosure of which is incorporated by reference herein.

The coordinating server 30 may also provide a user interface 31, which may be connected directly to the server or which may be provided to a remote user terminal. For example, the user interface 31 may include a display panel and user input controls for displaying information to a user, or the user interface 31 may provide a web server for a remote device such as a laptop computer or a mobile phone or a tablet computer to connect to the web server to retrieve, display, and, in some embodiments, modify or augment information on the remote device. In some embodiments, the user interface 31 displays the 3-D model or 3-D models generated from the point clouds captured by the camera groups 130. The user interface 31 may also report defects to a user by highlighting the defects detected in the objects by the defect detector (e.g., operation 350).

Figure 4B:
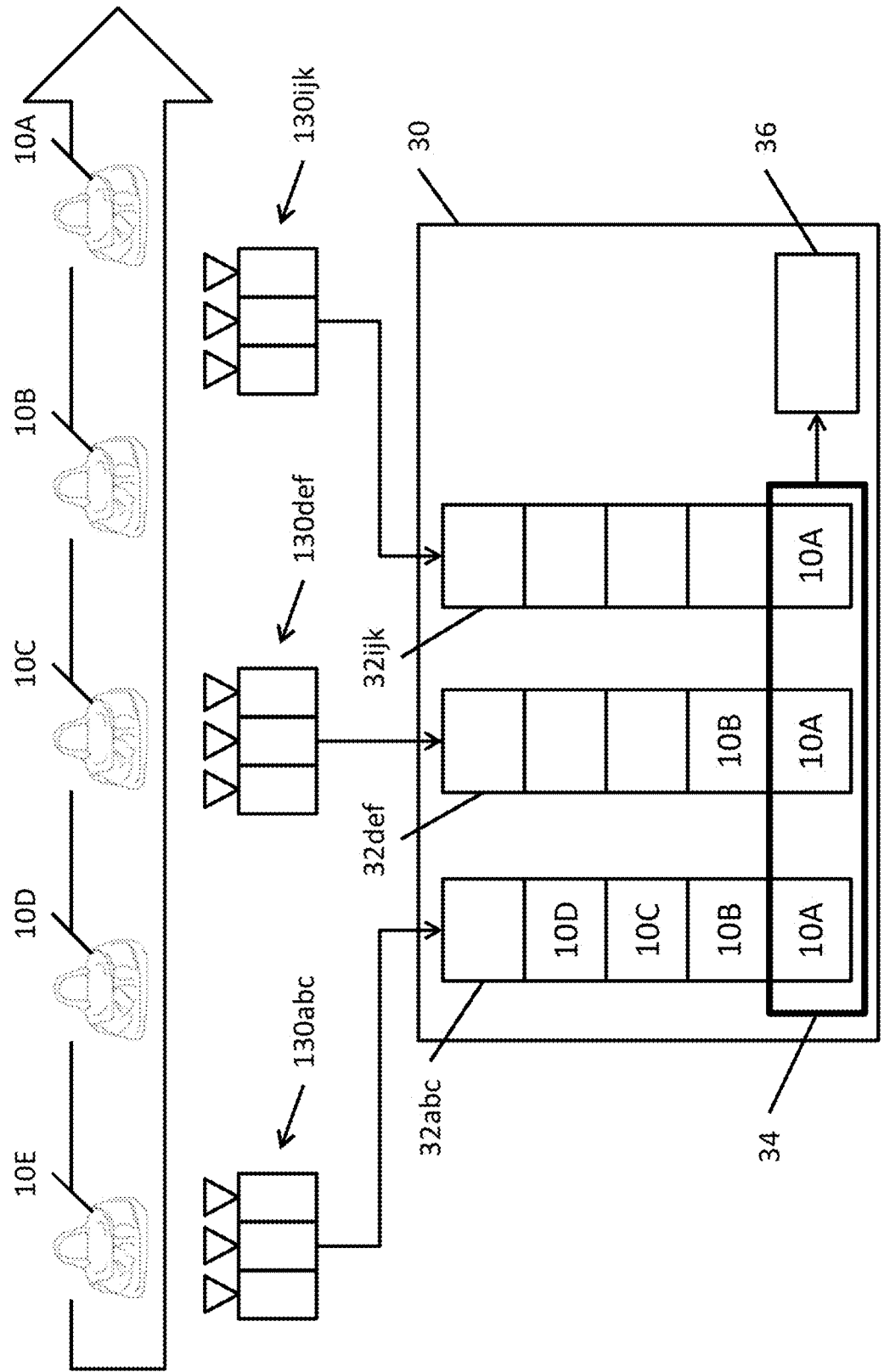
FIG. 4B is a schematic illustration of the correlation of data captured by multiple camera groups in communication with a coordinating server according to one embodiment of the present invention.

Aspects of embodiments of the present invention relate to systems and methods for coordinating the capture of data regarding the objects on the manufacturing line, combining corresponding sets of data captured by the camera groups to synthesize the 3-D models. FIG. 4B is a schematic illustration of the correlation of data captured by multiple camera groups in communication with a coordinating server according to one embodiment of the present invention. For example, if handbags 10A, 10B, 10C, 10D, and 10E are moving along the manufacturing line, then images captured of handbag 10A by the first camera group 130abc should be combined with the images of handbag 10A captured by the second group 130def. Any images or other data relating to handbag 10B should not be combined, for example, with images or other data of handbag 10A or handbag 10C.

To match up the chunks captured by the different camera groups 130 of the same object 10, in some embodiments of the present invention, the manufacturing line is assumed to operate in a first-in-first-out (FIFO) manner, where the objects remain in the same order between the first camera group and the last camera group. For example, if objects A, B, and C pass by the first camera group 130abc, it is assumed that the objects will pass by the second camera group 130def and the third camera group 130ijk in the same order: A, B, and C. As such, the images (e.g., of object A) captured by the first camera group 130abc may be stored (e.g., buffered) in the system (e.g., in the controller 24 of the first camera group or at the coordinating server 30) until the additional data about the same object is also received from all of the other relevant camera groups (e.g., other camera groups directed to this particular manufacturing line), such that all of the data can be combined.

Referring to FIG. 4B, in one embodiment of the present invention, the coordinating server 30 includes buffers 32abc, 32def, and 32ijk corresponding to respective camera groups 130abc, 130def, and 130ijk. In the state shown in FIG. 4B, object 10A, 10B, 10C, 10D, and 10E are moving along a manufacturing line as represented by the block arrow pointing to the right, and camera group 130abc is in the process of scanning object 10E. Camera group 130abc previously scanned objects 10A, 10B, 10C, and 10D, and therefore the data corresponding to those objects are stored in four corresponding locations in buffer 32abc (with one empty slot in buffer 32abc). Object 10D is between camera groups 130abc and 130def and is not currently being scanned. Camera group 130def is scanning object 10C, and previously scanned objects 10A and 10B, and therefore the corresponding data captured by 130def of objects 10A and 10B are stored in the corresponding buffer 32def of the coordinating server 30. Object 10B is between camera groups 130def and 130ijk and is not being scanned. Object 10A is exiting the field of view of camera group 130ijk, which has completed its scan and stored the data corresponding to object 10A in corresponding buffer 32ijk.

Due to the potentially high latency between the time at which the object is scanned by the first camera group 130abc and the time at which the object is scanned by the last camera group (e.g., third camera group 130ijk), and due to the number of objects that may be scanned during that period, the controllers 24 and/or the coordinating server 30 may require substantial storage space to preserve the data awaiting to be combined with later scans. The particular amount of storage space required may depend on, for example, image resolution, point cloud resolution, the throughput of the manufacturing line, the number of scans that need to be stored in the time between the first scan of the object and the last scan of the same object, and the like. In some circumstances, bursts of high numbers of objects upstream in a line or stalls or slowdowns downstream in the line may cause data to accumulate in buffers corresponding to upstream camera groups. Accordingly, some embodiments of the present invention relate to reducing the size of data (e.g., through lossless or lossy compression, data decimation, and the like) to avoid overflow of the buffers.

In the example shown in FIG. 4B, the coordinating server 30 is merely aggregating data from the three different camera groups 130abc, 130def, and 130ijk. Because data from all three camera groups regarding object 10A are now buffered, the further processing on the group of data can proceed (as indicated by the thick black rectangle 34 around the portions of the three buffers storing data associated with object 10A) through a group data processor 36 of the coordinating server. In some embodiments of the present invention, the group data processor 36 generates a combined 3-D model (e.g., 3-D mesh model or 3-D point cloud). In some embodiments, the group data processor 36 generates a cumulative report on defects detected in the three separate partial 3-D models captured by the separate camera groups 130*abc*, 130*def*, and 130*ijk*, and the report may be used to control aspects of the manufacturing line (e.g., controlling an actuator to divert defective objects out of the stream and to update production tracking records to note the defective object) and/or the report may be displayed to a user via the user interface.

In some embodiments of the present invention, the coordinating server 30 may also perform defect detection on individual "chunks" of the object received from the camera groups 130 or may also perform global defect detection across different camera groups using the group data processor 36 as discussed above. For example, individual camera groups may be unable to detect defects in their individual images of different sides of the bag, but an assembled global 3-D model of the bag may reveal that different parts of the bag that were supposed to be made of the same color material were actually made from different materials (e.g., a black leather handle was attached to a brown leather bag). Accordingly, in some embodiments, the coordinating server 30 may perform additional defect detection.

In some embodiments of the present invention, the detected defects (e.g., as detected by the individual camera groups 130 or as detected by the coordinating server) are displayed to a user (e.g., a human manager of the manufacturing line) through a user interface 32. As noted above, the user interface may appear on a display device attached to the coordinating server 30 or may be on a remote device such as a mobile phone, a tablet computer, a laptop computer, or a desktop computer. In some circumstances, a web browser running on the remote device is used to connect to the user interface 32 (e.g., the user interface 32 may be a web server). In some circumstances, an application (or "app") executing on the remote device connects to the user interface 32 (e.g., a user interface server) through an application programming interface (API) to obtain data regarding the objects 10 scanned by the camera groups 130.

In various embodiments of the present invention, defects in the objects 10 scanned by the camera groups 130 and as detected by defect detection algorithms (e.g., running on the controller 24 of the camera groups 130 and/or on the coordinating server 30) are displayed to the user. For example, in some embodiments of the present invention, a 3-D model representing the object 10 (e.g., the partial 3-D models captured by the camera groups 130 or the full 3-D model of the entire object) may be displayed to the user, where portions that are detected to be defective are highlighted (e.g., with a colored outline or with transparent shading). Accordingly, embodiments of the present invention support efforts in quality assurance in a manufacturing facility.

In some embodiments of the present invention, the coordinating server 30 controls the conveyor system 12 (e.g., an actuator in the conveyor system controlling a door) to divert objects 10 that are detected as having defects, such that the diverted objects can be inspected manually to confirm the presence of a defect or to remove the defective products from the output stream. In some embodiments, the coordinating server 30 has access to the state of the conveyor system 12 in order to dynamically estimate the pipeline state.

Diagnosing Problems with Camera Group Capture Systems

Figure 5:
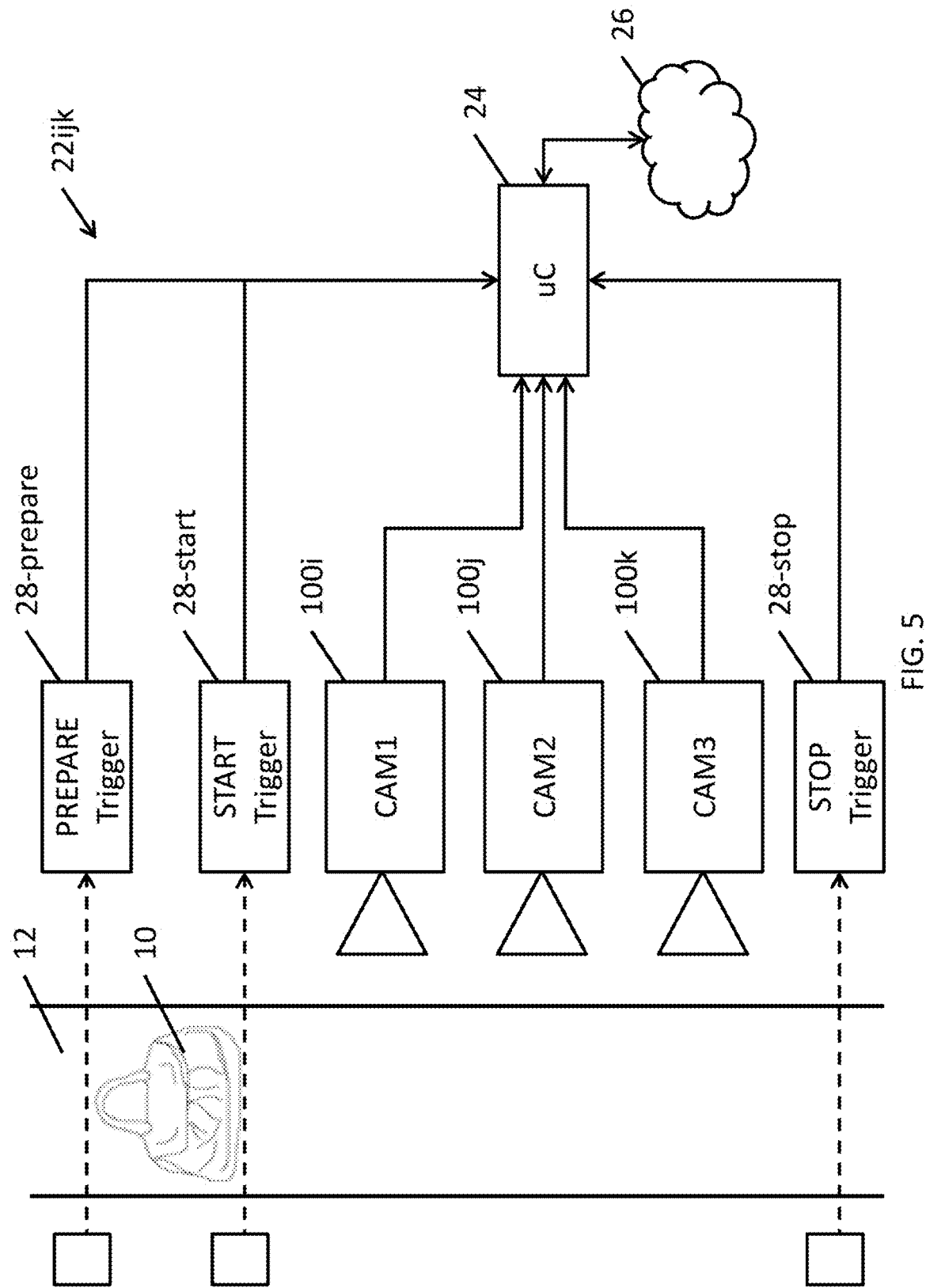
FIG. 5 is a schematic diagram of a camera group with three triggers according to one embodiment of the present invention.

Some aspects of the present invention relate to the analysis of failures within the cameras 100, the camera groups 130, and or the triggering systems 28. FIG. 5 is a schematic diagram of a camera group with three triggers according to one embodiment of the present invention. As shown in FIG. 5, in some embodiments of the present invention, a camera group 130 may include a PREPARE trigger 28-prepare, a START trigger 28-start, and a STOP trigger 28-stop. As previously discussed, the PREPARE trigger 28-prepare may be configured to detect when an object 10 is approaching the camera group 130*ijk* (e.g., well before the object 10 reaches the fields of view of the cameras 100), thereby allowing the camera group 130*ijk* to perform setup or initialization operations prior to the arrival of the object 10. The START trigger 28-start may control the cameras 100 to begin capturing data, and the STOP trigger 28-stop may control the cameras 100 to stop capturing data. In some embodiments of the present invention, the START trigger 28-start and STOP trigger 28-stop may be used to identify when a particular object enters and exits the fields of view of the cameras 100, such as may be the case if the objects are spaced so closely enough on the conveyor system 12 that multiple objects 10 appear in a single frame. In some embodiments, only the PREPARE trigger is a physical system and the START and STOP triggers are virtual triggers whose signals are computed as a delay from the PREPARE trigger signal, accounting for the conveyor speed, the geometrical properties of the object being framed and the physical placement of the cameras.

The timing of triggering signals provided by the triggers 28 provides information about the failure of various portions of the camera group 130. For example, if no data was captured by the cameras during a particular time period, but triggering signals were received from the START trigger 28-start at the start of the particular time period and from the STOP trigger 28-stop at the end of the particular time period, then it is possible that some aspect of the cameras 100 has failed (e.g., failure of a USB port connected to the cameras, software crash on the camera, out of storage space for images on the controller 24, and the like). On the other hand, if, for example, the START trigger 28-start is detected but the PREPARE trigger 28-prepare is not detected, this may signify a failure in the PREPARE trigger 28-prepare itself.

Accordingly, some aspects of embodiments of the present invention relate to using the controller 24 to collect time-stamped logs of data regarding the activation of the triggers 28 of a camera group 130 and the data captured by the camera group 130. In some embodiments, the controller 24 automatically detects and diagnoses failures in the camera group 130 based on the logging data received from the triggers 28 and the cameras 100. In some embodiments, the camera group automatically generates and transmits notifications of failures to the coordinating server 30 to inform a user of the failure through the user interface 31.

As such, aspects of embodiments of the present invention relate to systems and methods for three-dimensional data acquisition and processing under timing constraints.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system for acquiring three-dimensional (3-D) models of objects, comprising a first camera group comprising:
   a first plurality of depth cameras having different overlapping fields of view within the first plurality of depth cameras;
   a first processor;
   a first memory storing instructions that, when executed by the first processor, cause the first processor to:
   control the first depth cameras to simultaneously capture a first group of images of a first portion of a first object,
   compute, based on the first group of images, a partial 3-D model representing the first portion of the first object, and
   detect defects in the first object based on the partial 3-D model representing the first portion of the first object;
   a second plurality of depth cameras having overlapping fields of view within the second plurality of depth cameras, the second depth cameras being spaced apart from the first depth cameras and comprising non-overlapping fields of view with the first plurality of depth cameras;
   a second processor; and
   a second memory storing instructions that, when executed by the second processor, cause the second processor to:
   control the second depth cameras to simultaneously capture a second group of images of a second portion of the first object,
   compute a partial 3-D model representing the second portion of the first object, and
   detect defects in the first object based on the partial 3-D model representing the second portion of the first object; and
   a coordinating server comprising a third processor and a third memory storing instructions that, when executed by the third processor, cause the third processor to:
   receive the partial 3-D model representing the first portion of the first object from the first depth cameras;
   receive the partial 3-D model representing the second portion of the first object from the second depth cameras; and
   combine data from the partial 3-D model representing the first portion of the first object and the partial 3-D model representing the second portion of the first object.

2. The system of claim 1, wherein the first camera group further comprises a first start trigger configured to detect the arrival of an object when the object enters the overlapping fields of view of the first depth cameras, and
   wherein the first processor is configured to control the first depth cameras of the first camera group to capture images of the object in response to receiving a triggering signal from the first start trigger.

3. The system of claim 2, wherein the first camera group further comprises a first stop trigger configured to detect the departure of the object from the overlapping fields of view of the first depth cameras, and
   wherein the first processor is configured to control the first depth cameras of the first camera group to cease capture of images of the object in response to receiving a triggering signal from the first stop trigger.

4. The system of claim 2, wherein the first camera group further comprises a first prepare trigger configured to detect the presence of the object before the object enters the overlapping fields of view of the first depth cameras, and
   wherein the first processor is configured to control the first depth cameras of the first camera group to prepare to capture of images of the object in response to receiving a triggering signal from the first prepare trigger.

5. The system of claim 1, wherein the overlapping fields of view of the first depth cameras are directed to a portion of a conveyor system configured to convey a plurality of objects, and
   wherein the conveyor system is configured to convey the objects to enter the overlapping fields of view of the first depth cameras one at a time.

6. The system of claim 5, wherein the conveyor system moves at a non-uniform speed and the objects arrive within the overlapping fields of view of the first camera group at a plurality of different rates, the different rates comprising a maximum burst rate and an associated maximum burst time, and
   wherein the first memory of the first camera group comprises a buffer having a size sufficient to store images of the objects arriving a maximum burst rate during the associated maximum burst time, the size being a function of at least a resolution of the first depth cameras and a frame rate of the first depth cameras.

7. A system for acquiring three-dimensional (3-D) models of objects, comprising a first camera group comprising:
   a first plurality of depth cameras having overlapping fields of view;
   a first processor; and
   a first memory storing instructions that, when executed by the first processor, cause the first processor to:
   control the first depth cameras to simultaneously capture a first group of images of a first portion of a first object;
   compute, based on the first group of images, a partial 3-D model representing the first portion of the first object; and
   detect defects in the first object based on the partial 3-D model representing the first portion of the first object,
   wherein the overlapping fields of view of the first depth cameras are directed to a portion of a conveyor system configured to convey a plurality of objects,
   wherein the conveyor system is configured to convey the objects to enter the overlapping fields of view of the first depth cameras one at a time,
   wherein the conveyor system moves at a non-uniform speed and the objects arrive within the overlapping fields of view of the first camera group at a plurality of different rates,
   wherein the first memory of the first camera group comprises a buffer configured to store images captured by the first depth cameras, and
   wherein the first memory further stores instructions that, when executed by the first processor, cause the first processor to:
   determine a current buffer occupancy of the buffer;
   determine whether the current buffer occupancy exceeds a threshold;
   in response to determining that the current buffer occupancy does not exceed the threshold, set configuration parameters of the first camera group to a nominal capture quality; and
   in response to determining that the current buffer occupancy exceeds the threshold:

determine a new quality level based on a plurality of configuration settings stored in the first memory, the current buffer occupancy, and a current rate of the plurality of different rates; and
set the configuration parameters of the first camera group to the new quality level.

8. The system of claim 1, further comprising a second camera group comprising:
a second plurality of depth cameras having overlapping fields of view, the second depth cameras being spaced apart from the first depth cameras and comprising non-overlapping fields of view with the first plurality of depth cameras;
a second processor; and
a second memory storing instructions that, when executed by the second processor, cause the second processor to:
control the second depth cameras to simultaneously capture a second group of images of a second portion of the first object;
compute a partial 3-D model representing the second portion of the first object; and
detect defects in the first object based on the partial 3-D model representing the second portion of the first object.

9. The system of claim 8, further comprising a coordinating server comprising a third processor and a third memory storing instructions that, when executed by the third processor, cause the third processor to:
receive the partial 3-D model representing the first portion of the first object from the first camera group;
receive the partial 3-D model representing the second portion of the first object from the second camera group; and
combine data from the partial 3-D model representing the first portion of the first object and the partial 3-D model representing the second portion of the first object.

10. The system of claim 9, wherein the third memory further stores:
a first buffer configured to store data from the first camera group;
a second buffer configured to store data from the second camera group; and
instructions that, when executed by the third processor, cause the third processor to:
detect when the first buffer and the second buffer both store data corresponding to the first object; and
combine the data from the first camera group representing the first portion of the first object with the data from the second camera group representing the second portion of the first object.

11. The system of claim 10, wherein the instructions to combine the data from the first camera group representing the first portion of the first object with the data from the second camera group representing the second portion of the first object comprises merging the partial 3-D model representing the first portion of the first object with the partial 3-D model representing the second portion of the first object.

12. The system of claim 1, wherein the 3-D model is a point cloud.

13. The system of claim 1, wherein the 3-D model is a mesh model.

14. The system of claim 1, wherein each of the first depth cameras and the second depth cameras comprises:
a first invisible light two-dimensional (2-D) camera having a first optical axis and a first field of view;
a second invisible light 2-D camera having a second optical axis substantially parallel to the first optical axis of the first invisible light 2-D camera and having a second field of view overlapping the first field of view of the first invisible light 2-D camera;
a color 2-D camera having a third optical axis substantially parallel to the first optical axis of the first invisible light 2-D camera and having a third field of view overlapping the first field of view of the first invisible light 2-D camera; and
a projection source configured to emit invisible light in a portion of the electromagnetic spectrum detectable by the first invisible light 2-D camera and the second invisible light 2-D camera.

15. A method for acquiring three-dimensional (3-D) models of objects, comprising:
controlling, by a processor, a first camera group to simultaneously capture a first group of images of a first portion of a first object, the first camera group comprising a first plurality of depth cameras having different overlapping fields of view within the first plurality of depth cameras;
computing, by the processor based on the first group of images, a partial 3-D model representing the first portion of the first object;
detecting defects in the first object based on the partial 3-D model representing the first portion of the first object;
controlling, by the processor, a second camera group to simultaneously capture a second group of images of a second portion of the first object, the second camera group comprising a second plurality of depth cameras being spaced apart from the first depth cameras and comprising non-overlapping fields of view with the first plurality of depth cameras;
computing a partial 3-D model representing the second portion of the first object; and
detecting defects in the first object based on the partial 3-D model representing the second portion of the first object;
receiving, at a coordinating server, the partial 3-D model representing the first portion of the first object from the first camera group;
receiving the partial 3-D model representing the second portion of the first object from the second camera group; and
combining data from the partial 3-D model representing the first portion of the first object and the partial 3-D model representing the second portion of the first object.

16. The method of claim 15, wherein the first camera group further comprises a first start trigger configured to detect the arrival of an object when the object enters the overlapping fields of view of the first depth cameras, and
wherein the method further comprises controlling the first depth cameras of the first camera group to capture images of the object in response to receiving a triggering signal from the first start trigger.

17. The method of claim 16, wherein the first camera group further comprises a first stop trigger configured to detect the departure of the object from the overlapping fields of view of the first depth cameras, and
wherein the method further comprises controlling the first depth cameras of the first camera group to cease capture of images of the object in response to receiving a triggering signal from the first stop trigger.

18. The method of claim 16, wherein the first camera group further comprises a first prepare trigger configured to detect the presence of the object before the object enters the overlapping fields of view of the first depth cameras, and wherein the method further comprises controlling the first depth cameras of the first camera group to prepare to capture of images of the object in response to receiving a triggering signal from the first prepare trigger.

19. The method of claim 15, wherein the overlapping fields of view of the first depth cameras are directed to a portion of a conveyor system configured to convey a plurality of objects, and wherein the conveyor system is configured to convey the objects to enter the overlapping fields of view of the first depth cameras one at a time.

20. The method of claim 19, wherein the conveyor system moves at a non-uniform speed and the objects arrive within the overlapping fields of view of the first camera group at a plurality of different rates, the different rates comprising a maximum burst rate and an associated maximum burst time, and wherein the first camera group comprises a memory comprising a buffer having a size sufficient to store images of the objects arriving a maximum burst rate during the associated maximum burst time, the size being a function of at least a resolution of the first depth cameras and a frame rate of the first depth cameras.

21. The method of claim 19, wherein the conveyor system moves at a non-uniform speed and the objects arrive within the overlapping fields of view of the first camera group at a plurality of different rates, wherein the first camera group comprises a memory comprising a buffer configured to store images captured by the first depth cameras, and wherein the method further comprises:

determining a current buffer occupancy of the buffer;

determining whether the current buffer occupancy exceeds a threshold;

in response to determining that the current buffer occupancy does not exceed the threshold, setting configuration parameters of the first camera group to a nominal capture quality; and in response to determining that the current buffer occupancy exceeds the threshold:

determining a new quality level based on a plurality of configuration settings stored in the first memory, the current buffer occupancy, and a current rate of the plurality of different rates; and setting the configuration parameters of the first camera group to the new quality level.

22. The method of claim 15, wherein the coordinating server comprises:

a first buffer configured to store data from the first camera group; and a second buffer configured to store data from the second camera group, wherein the method further comprises:

detecting, by the coordinating server, when the first buffer and the second buffer both store data corresponding to the first object; and combining, by the coordinating server, the data from the first camera group representing the first portion of the first object with the data from the second camera group representing the second portion of the first object.

23. The method of claim 22, wherein the combining the data from the first camera group representing the first portion of the first object with the data from the second camera group representing the second portion of the first object comprises merging the partial 3-D model representing the first portion of the first object with the partial 3-D model representing the second portion of the first object.

24. The method of claim 15, wherein the 3-D model is a point cloud.

25. The method of claim 15, wherein the 3-D model is a mesh model.

26. The method of claim 15, wherein each of the first depth cameras and the second depth cameras comprises:

a first invisible light two-dimensional (2-D) camera having a first optical axis and a first field of view;

a second invisible light 2-D camera having a second optical axis substantially parallel to the first optical axis of the first invisible light 2-D camera and having a second field of view overlapping the first field of view of the first invisible light 2-D camera;

a color 2-D camera having a third optical axis substantially parallel to the first optical axis of the first invisible light 2-D camera and having a third field of view overlapping the first field of view of the first invisible light 2-D camera; and a projection source configured to emit invisible light in a portion of the electromagnetic spectrum detectable by the first invisible light 2-D camera and the second invisible light 2-D camera.

* * * * *